United States Patent [19]
Johnson et al.

[11] Patent Number: 5,669,632
[45] Date of Patent: Sep. 23, 1997

[54] AIRBAG TETHER AND ATTACHMENT SEAM

[75] Inventors: David B. Johnson, Brigham City; John L. Sabin, Kaysville; Scott B. Okelberry, Logan, all of Utah

[73] Assignee: Morton International, Inc., Chicago, Ill.

[21] Appl. No.: 739,735

[22] Filed: Nov. 7, 1996

Related U.S. Application Data

[63] Continuation of Ser. No. 552,945, Nov. 3, 1995, abandoned.
[51] Int. Cl.$^6$ ................................................. B60R 21/20
[52] U.S. Cl. .................................... 280/743.2; 280/743.1
[58] Field of Search ........................... 280/743.2, 743.1

[56] References Cited

U.S. PATENT DOCUMENTS

| | | | |
|---|---|---|---|
| 4,921,735 | 5/1990 | Bloch | 280/743.2 |
| 5,078,423 | 1/1992 | Fujita | 280/743.2 |
| 5,277,230 | 1/1994 | Sollars, Jr. | 280/743.2 |
| 5,378,011 | 1/1995 | Rogerson et al. | 280/743.2 |

FOREIGN PATENT DOCUMENTS

| | | | |
|---|---|---|---|
| 2-37060 | 2/1990 | Japan | 280/743.2 |
| 3-197255 | 8/1991 | Japan | 280/743.2 |
| 4-163253 | 1/1992 | Japan | 280/743.2 |
| 6-16099 | 1/1994 | Japan | 280/743.1 |
| 1438032 | 6/1976 | United Kingdom | 280/743.2 |
| 2261855 | 2/1993 | United Kingdom | 280/743.2 |
| 2262919 | 7/1993 | United Kingdom | 280/743.2 |

*Primary Examiner*—Eric D. Culbreth
*Attorney, Agent, or Firm*—George W. Rauchfuss, Jr.; Gerald K. White

[57] ABSTRACT

The internal tether of a driver's side automotive airbag is of one or two members, each having a plurality of radial straps. Central portions of the tether are sewn to the airbag front panel by a seam which includes a linear portion crossing the center line of each of the radial strips. In the case of a square seam, the square has rounded corners of a radius suitable for gradually transferring the load from the tether to the front panel to reduce stress concentrations.

7 Claims, 2 Drawing Sheets

AIRBAG TETHER AND ATTACHMENT SEAM

This application is a continuation of application Ser. No. 08/552,945, filed Nov. 3, 1995 abandoned

TECHNICAL FIELD

This invention relates to automotive airbags. More particularly, it relates to such airbags having internal tethers for limiting and controlling the shape of the expanding airbag.

BACKGROUND ART

Automotive airbags are normally made of fabric and the folded airbag is housed in a module which may be mounted behind a portion of an instrument panel or, in the case of a driver's side airbag, in a steering wheel. Upon the occurrence of a crash of sufficient magnitude, a sensor actuates an inflator. The inflator is designed to produce, by any of several means, a large quantity of rapidly moving inflating gas sufficient to forcefully expand the airbag into the passenger compartment to cushion the impact of a human body and, in particular, the upper torso, head, and face.

In order to control the shape of the expanding airbag, it is the practice to install internal tethers. A common type of tether is a cruciform section having a central body which is stitched to the front panel of the airbag. From this central body extend four radial straps. The distal end of each strap is secured to the rear panel of the airbag. The function of the tether is to restrain the center of the front panel during inflation so that the airbag's diameter expands rapidly to receive the impact.

The pattern of the stitching which secures the central body of the tether to the front panel is normally circular. It has been discovered that stress concentrations occur at the point of intersection of the circular stitched seam with the center lines of the straps. These concentrations of stress result in material failure, or "combing" and also result in breaking the stitched seam. Furthermore, the cruciform layout of the tether wastes a substantial amount of fabric because the patterns do not "nest" efficiently on the fabric surface from which they are cut.

It would also be desirable to reduce the size of the folded airbag. One way of accomplishing this would be to reduce the fabric denier. However, this would also reduce the fabric strength and render it more susceptible to tearing.

Accordingly, it is a primary object of the present invention to provide an airbag tether configuration which reduces and redistributes stress between the expanding airbag panel and the tether. Another object is to improve fabric utilization. Another object is to reduce the size of the folded airbag pack. Other objects, features, and advantages will become apparent from the following description and appended claims.

DISCLOSURE OF INVENTION

The invention comprises a multi-spoked tether in the form of a central body and a plurality of radially extending straps. The central body is secured to the front panel of the airbag by means of a rectangular stitched seam comprised of linear segments crossing the center line of each of the straps. In one embodiment of the invention, two or more such tethers are secured to the front panel by means of the same stitched seam.

BEST MODE FOR CARRYING OUT THE INVENTION

Figure 1:
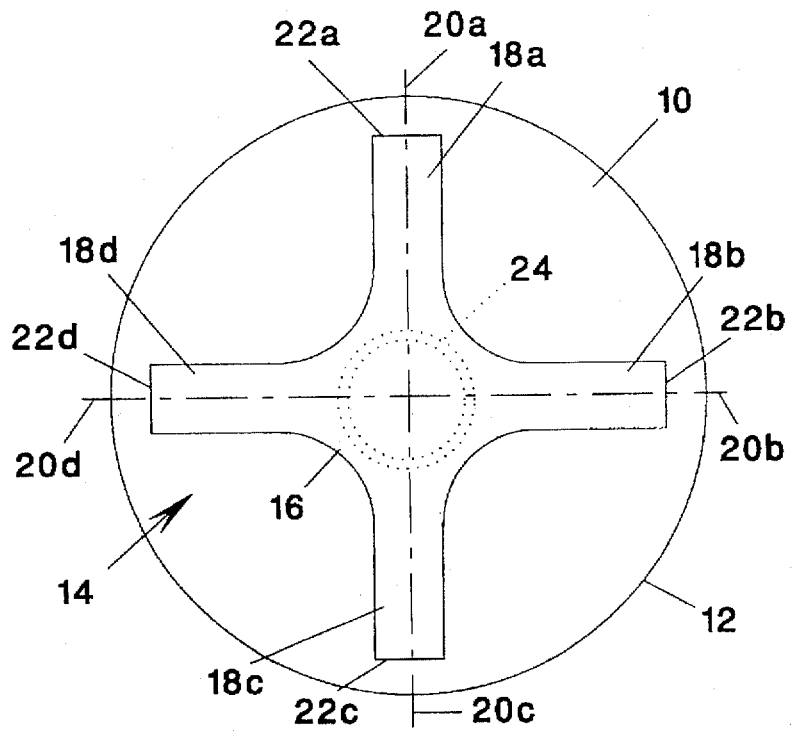
FIG. 1 is a plan view of the inner side of an airbag front panel having a tether secured thereto in the manner known to the prior art.

FIG. 1 illustrates the front panel 10 of a conventional driver's side airbag which is customarily circular in shape. This panel is normally fabric and includes a peripheral edge 12 which is secured to the corresponding edge of a circular rear panel, as by stitching, to form the airbag cushion. In order to more rapidly increase the diametrical expansion of the airbag, a tether 14 is sewn to the inner surface of the front panel 10. The tether 14 includes a central body 16 from which extend a plurality of radial straps 18a–d. Each of the radial straps extends along its corresponding center line 20a–d and terminates at its respective distal end 22a–d.

In accordance with the prior art as illustrated in FIG. 1, the central body 16 of the tether is secured to the front panel 10 by means of one or more circular stitching seams 24. It has been discovered, however, especially with the advent of higher performance inflators, that stress concentrations rise at the intersections of the circular seams with each of the strap center lines. This has resulted in stitching and material failures and combing as previously described.

Figure 2:
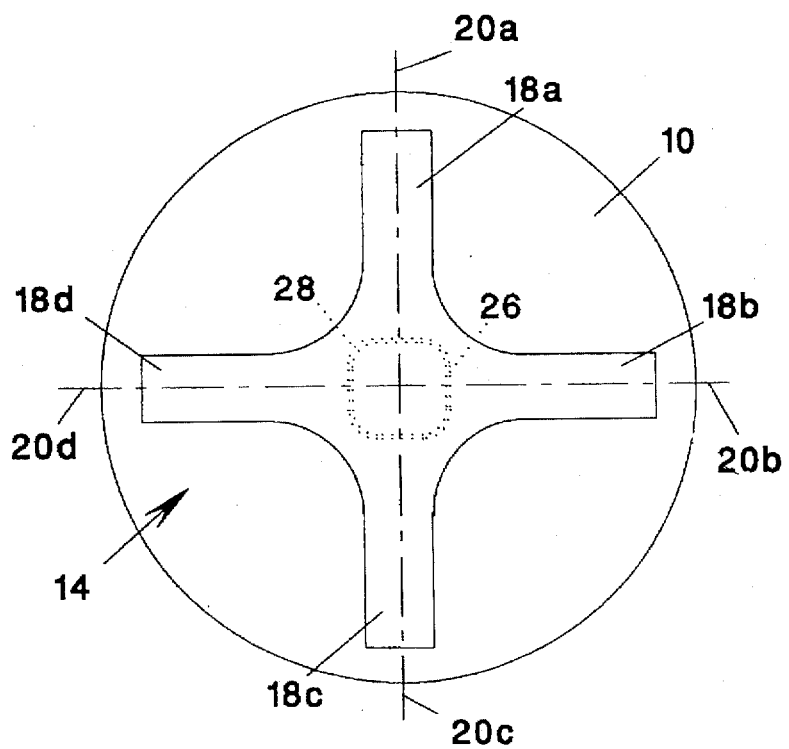
FIG. 2 is a view similar to FIG. 1 but illustrating the connecting seam of the present invention.

In the following illustrations, similar reference numerals are used for elements similar to those in FIG. 1. Accordingly, there is illustrated in FIG. 2 the inner side of a front panel 10 having attached thereto a similar tether 14. However, the circular seam 24 of FIG. 1 has been replaced by a rectangular, in this case a square, stitching seam 26. The seam 26 is positioned such that the linear portion forming each side of the square extends substantially perpendicularly across the respective center line 20a–d of the straps 18a–d. It has been discovered that these linear portions evenly distribute the stress across the tether and seam interface. In addition, the square seam is provided with rounded or radius corners 28. In the case of a square seam, the radius of each corner is preferably from 20% to 45% of the length of each side of the square, as it would have been if unrounded. For example, in one embodiment, the seam is 165 mm×165 mm and the radius of each corner is 50 mm. These corners assist in gradually transferring the load of inflation from the tether 14 to the front panel 10.

Figure 3:
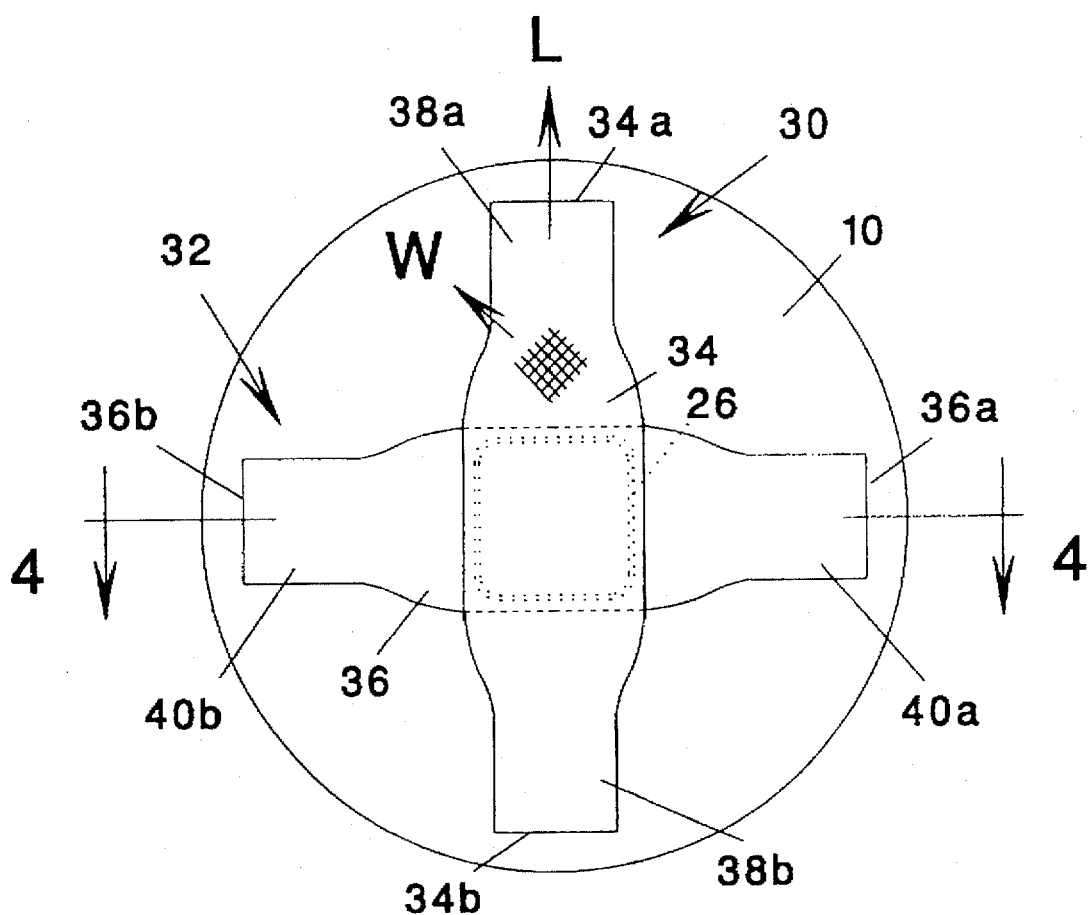
FIG. 3 is a view similar to FIG. 2 illustrating a modified tether of this invention.
Figure 4:
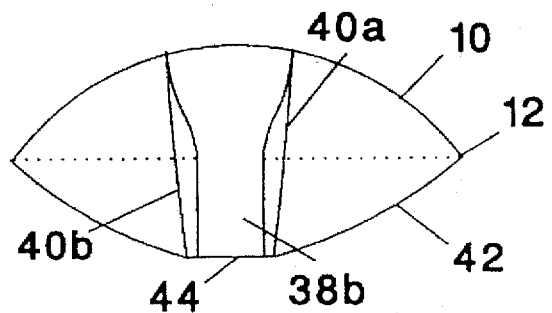
FIG. 4 is a cross-section taken substantially along the line 4—4 of FIG. 3 but showing the entire airbag in its expanded condition, with the tethers attached to the rear panel.

In FIGS. 3 and 4 there is illustrated a modified version of the invention. In this modification, a pair of tethers 30, 32 replace the single tether previously described. Each of these tethers includes a respective central body 34, 36 which is secured to the front panel 10 by the same square seam 26 as previously described. It will be noted that tethers 30, 32 are substantially linear and are easily and efficiently aligned and nested. Accordingly, they may be cut from the fabric with a minimum amount of waste. The respective distal ends 34a–b of the radial straps 38a, 38b of the tether 30 and the distal ends 36a, 36b of radial straps 40a, b of the tether 32 are secured to the circular rear panel 42. The distal ends of the straps are secured adjacent a central opening 44 (FIG. 4) in the rear panel 42 which receives the inflating gas from an inflator (not shown).

Four spoke tethers cut from one piece of fabric experience stress concentrations between the spokes during airbag deployment. The two-piece tether illustrated in FIGS. 3 and 4 eliminates these concentrations. Each tether transmits forces in a uniaxial direction and does not transmit force to the perpendicular spoke, thereby reducing concentrations of stress between adjoining spokes. The two-piece tether is also less affected by unequal forces resulting from bag folds and deployment angle. The combination of the square seam and the two-piece tether has permitted 630d airbag fabric to be replaced with 420d material without a corresponding substantial loss of strength.

Another important feature of the invention is illustrated in FIG. 3 but is also applicable to the embodiment of FIG. 2. This is that the axial load on the tether should lie on an approximately 45° angle to the warp of the tether fabric. The warp threads of a fabric are those which extend the length of the fabric on a bolt. This is illustrated schematically by the cross hatch symbol on tether 30 which shows the warp W of its fabric at a 45° angle to the axial load L along the axis of the strap 38a. This has been found to reduce combing.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. In an automotive airbag having a rear panel with a peripheral first edge and a front panel with a peripheral second edge, said first and said second peripheral edges being joined, the improvement comprising:

a first internal tether having a central body joined to said front panel by a stitched seam and two opposed radial straps unitary with and extending from said central body of said first tether, each of said two opposed radial straps of said first tether extending along a center line to a distal end secured to said rear panel, a second internal tether having a central body joined to said front panel by said stitched seam and two opposed radial straps unitary with and extending from the central body of said second tether, each of said two opposed radial straps of said second tether extending along a center line to a distal end secured to said rear panel and with the center lines of the two radial straps of said second tether being angularly displaced substantially 90° from the two radial straps of said first tether, said stitched seam being substantially in the form of a rectangle with rounded corners having four substantially linear side portions with the center lines of each of said four radial straps extending, respectively, across a linear side portion of the rectangle add each rounded corner having a radius between substantially 20% to 45% of the length of each rectangle side prior to the rounding of the corners, and wherein the airbag panels comprise fabric material having a denier no greater than 420.

2. The improvement of claim 1 wherein said angular displacement of the radial straps is substantially 90°.

3. The improvement of claim 2 wherein each of said straps is of fabric having a warp direction substantially 45° to the strap's center line.

4. The improvement of claim 2 wherein said stitched seam is substantially square.

5. The improvement of claim 4 wherein the substantially linear side portion of each square side is substantially perpendicular to the center line of a radial strap.

6. The improvement of claim 5 wherein each of said straps is of fabric having a warp direction substantially 45° to the strap's center line.

7. The improvement of claim 1 wherein each of said straps is of fabric having a warp direction substantially 45° to the strap's center line.

* * * * *